July 4, 1950  G. T. BAKER  2,513,442
COUNTING ARRANGEMENT
Filed April 26, 1948  2 Sheets-Sheet 1

INVENTOR
GEORGE T. BAKER
By Young, Emery & Thompson
Attys.

Patented July 4, 1950

2,513,442

UNITED STATES PATENT OFFICE 2,513,442

COUNTING ARRANGEMENT

George Thomas Baker, Liverpool, England, assignor to Automatic Telephone & Electric Company Limited, Liverpool, England, a British company Application April 26, 1948, Serial No. 23,194
In Great Britain May 9, 1947

4 Claims. (Cl. 235—92)

The present invention relates to counting arrangements and is more particularly concerned with decade counting arrangements that is to say arrangements which give a count on a scale-of-ten basis.

There are three main types of decade counter, the first of which consists of a ring chain of ten counters for counting digits from 1 to 0. This is the simplest type of decade counter but at the same time the least economical. The second type of decade counter consists of a single binary or scale-of-two counter followed by a scale-of-five counter while the third consists of four scale-of-two counters with suitable feedback to reduce the count from 16 to 10.

The latter type of counter is very satisfactory in use owing to its greater stability and wide operating margins. It is however, a matter of some difficulty to provide a clear and direct indication of the count and while this may not be of great importance in a laboratory counter, it is an essential part of any industrial instrument.

The prime requirement of the indicator is that it will indicate whether or not a valve is conducting where electronic scale-of-two counters are used. In certain counters this is effected by providing a tuning indicator of the "magic eye" type within the valve envelope. With this arrangement the valve must be exposed or must be visible through apertures in a panel, a condition which does not facilitate the design of a compact industrial instrument. This difficulty may be avoided by the provision of an external indicator such as a neon tube for each scale-of-two counter. Such tubes are easy to mount on the face of the instrument but do not give the count directly.

Direct reading counters have been proposed in which ten indicators are employed which give successive indications for successive digits. Each indicator may be a neon tube controlled from the anode circuits of the scale-of-two counters. The correct functioning of such an indicator, however, requires a somewhat marginal selection of potentials from the valve anodes. Another direct reading arrangement consists of a circuit in which a current is derived from each binary or scale-of-two counter which is proportional to the digit represented by that stage. A micro-ammeter gives the sum of these currents and can be scaled to indicate the instantaneous count.

According to one feature of the present invention in a decade counting circuit employing a plurality of thermionic valve counting stages operating on a scale other than the denary scale, an indication of the count is obtained by applying potentials derived from the individual stages to the deflection plates of a cathode ray tube, the arrangement being such that the light spot on the screen of the tube takes up positions which are characteristic of the count on the denary scale.

According to another feature of the invention, in a decade counting circuit employing four thermionic valve counting stages each operating on the binary scale, an indication of the count is obtained by applying potentials derived from one of the anode circuits of each stage to the deflection plates of a cathode ray tube, the arrangements being such that the light spot on the screen of the tube takes up positions which are characteristic of the count on the denary scale.

According to a further feature of the invention, in a decade counting circuit employing a plurality of thermionic valve counting stages operating on a scale other than the denary scale, the digits 1 to 0 are provided in a predetermined spaced relationship on the screen of a cathode ray tube and potentials obtained from the counting stages are applied to the deflection plates of the tube in such a manner that as the count proceeds the spot illuminates successive digits to give the count on the denary scale.

The simplest arrangement would be for the different digits to be displayed in ten different positions in a line across the screen. The capabilities of the cathode ray tube are, however, not fully utilised in such an arrangement and according to a further feature of the invention the voltages applied to the deflection plates of the tube are arranged to be such that two-dimensional movement of the spot is obtained to give an extended scale. In a particular arrangement, employing four binary stages, four digits are displayed in a row, each direction of deflection is controlled by two of the four binary stages, the first two stages controlling the display of the digits in the row while the last two stages control the selection of the rows.

In a preferred arrangement each of the four binary stages is connected to a separate deflection plate of the tube and in order to enable the display to be given in numerical sequence one plate of each pair is connected to the normally conducting anode of a stage while the other is connected to the normally non-conducting anode of another stage.

The invention will be better understood from the following description of one embodiment taken in conjunction with the accompanying drawings comprising Figs. 1 to 4 in which.

Figure 1:
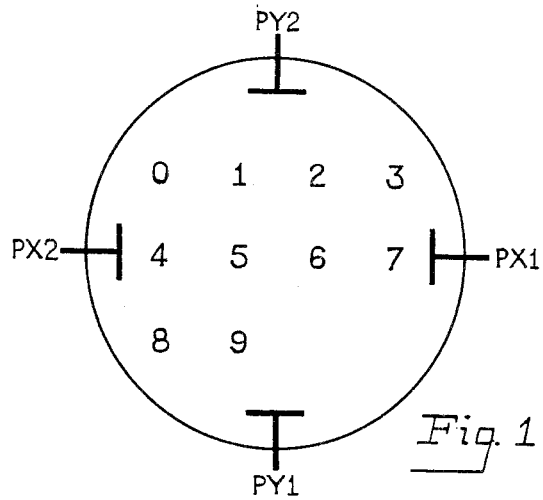
Fig. 1 shows the type of display provided by the invention.

Referring first to Fig. 1, the face of the cathode ray tube screen is provided with a series of digits from 0 to 9, as shown in the diagram. The tube can be of the small monitoring type and a simple method for providing the digits is to draw them on a piece of detail paper or tracing cloth which may then be fixed to the screen by a suitable adhesive. The movement of the spot is such that it passes from one digit to the next for each count, the number being illuminated when the spot is stationary. Preferably, the digits are printed on the paper or cloth in reverse and the paper is secured to the screen with the digits facing the screen. The unwanted digits are then less obtrusive and suitable contrast is obtained. In addition, the beam should be de-focussed slightly to illuminate the whole face of the digit and also to prolong the life of the screen.

Figure 2:
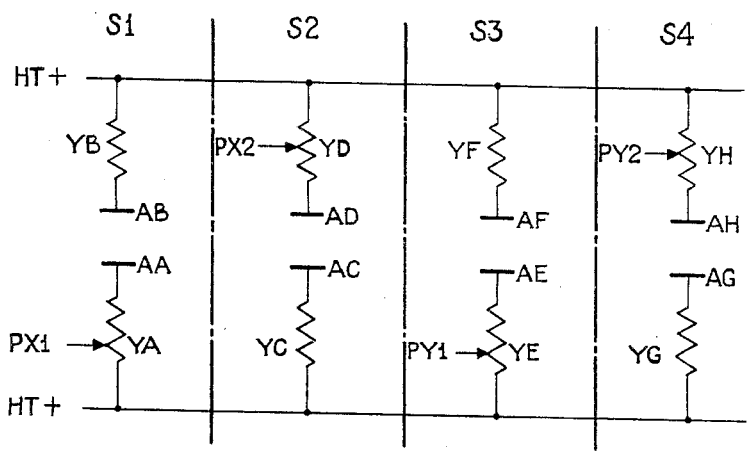
Fig. 2 shows the manner of connecting the deflection plates to the four binary stages.

In Fig. 2, each of the vertical elements, S1, S2, S3 and S4 represents a binary stage, the short thick horizontal strokes AA, AB, AC, AD, AE, AF, AG and AH representing the anodes of the two valves in each stage while resistances YA, YB, YC, YD, YE, YF, YG and YH represent the respective anode loads. It is assumed that in the resting or zero position the four lower elements are conducting. The deflection plate PX1 of the cathode ray tube is fed from a tapping on the anode resistance YA of the normally conducting element of the first stage while the deflection plate PX2 is fed from a tapping on the anode load YD of the non-conducting element of the second stage. Connections to the deflection plates PY1 and PY2 are similarly taken from the anode loads of the 3rd and 4th binary stages. It will be assumed that the potential difference between the plates PX1 and PX2 necessary to deflect the beam of the CRT so as to move the spot produced thereby horizontally from one digit position to the adjacent digit position is V volts. If this potential difference is such that plate PX2 is more positive than PX1 then the spot is displaced to the left whereas if the potential difference is reversed the deflection is to the right. Similar considerations apply to the vertical deflections of the beam. A potential difference of V volts between the plates PY1 and PY2 produces a vertical displacement of the spot equal to the distance between vertically adjacent digit positions and again the directions of displacement is towards the plate of more positive potential.

It will be assumed that the HT+ supply leads are the zero or reference potential of the circuit, the potential of other points being specified as relative to that potential.

In the resting or zero position of the circuit, current will be flowing through the anode load YA and the potential applied to the plate PX1 will be V volts negative as determined by the adjustment of the tapping on YA. There will be no current flowing through the anode load YD so the potential of the plate PX2 will be zero and thus the potential on plate PX2 will be more positive than that on plate PX1 by V volts. Similarly, the potential on the plate PY2 will be V volts more positive than that on plate PY1 and the spot will therefore be deflected to the left and upwards in order to illuminate the digit "0." On the count of one, current will cease to flow through the resistance YA and the potential of the plate PX1 will rise to zero so that the potential difference between the plates PX1 and PX2 is now zero and the spot will move to its centre position to illuminate the digit "1." On the count of two, anode AA will again conduct and so will anode AD and the position of the tapping on YD is such that the potential applied to the plate PX2 will be 2V volts negative so that the potential on plate PX1 is V volts more positive than that on plate PX2 and the spot will take up a position in which the digit "2" is illuminated. On the count of 3, AA becomes non-conducting while AD remains conducting therefore the potential on plate PX1 is 2V volts positive relative to plate PX2 and the digit "3" is illuminated.

On the count of 4, AA will be conducting and AD will be non-conducting so that the condition of the first two binary stages will be the same as for the count of 0 but in this case, AE becomes non-conducting and, AH remaining non-conducting, there is zero potential difference between the plates PY1 and PY2 and the spot takes up the position intermediate the plates PY1 and PY2 and adjacent to the plate PX2 to illuminate the digit "4." The digits "5," "6" and "7" are illuminated in a similar manner to that described for digits "1," "2" and "3" while on the count of 8, AE becomes conducting and so does AH to cause plate PY1 to take up a potential V volts more positive than plate PY2 so that the spot subsequently moves along the 3rd and last row to illuminate the digits "8" and "9" successively.

Figure 3:
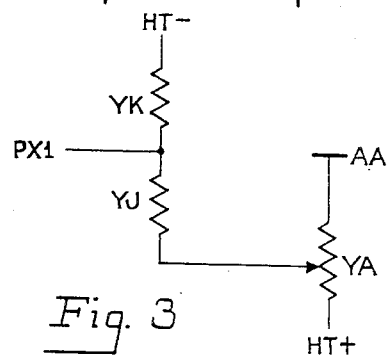
Fig. 3 shows a modification which is made to Fig. 2 to provide the symmetrical display shown in Fig. 1 and, Fig. 4 shows the detailed circuit of the embodiment of Fig. 3.

It will be seen that the arrangement described with reference to Fig. 2 will not provide a symmetrical display such as shown in Fig. 1. This however can easily be arranged by providing a permanent direct shift voltage between the plates PX1 and PX2. This may be effected as shown in Fig. 3, by taking the tapping from YA to a potentiometer consisting of two resistances YJ and YK connected to HT— and tapping the voltage for plate PX1 from the junction of the two resistances. If now the values of the resistances YJ and YK are so arranged that when anode AA is non-conducting the potential applied to the plate PX1 is ½V volts negative and when the anode AA is conducting the potential applied to plate PX1 is ⅜V volts negative, the symmetrical display shown in Fig. 1 will be obtained.

Figure 4:
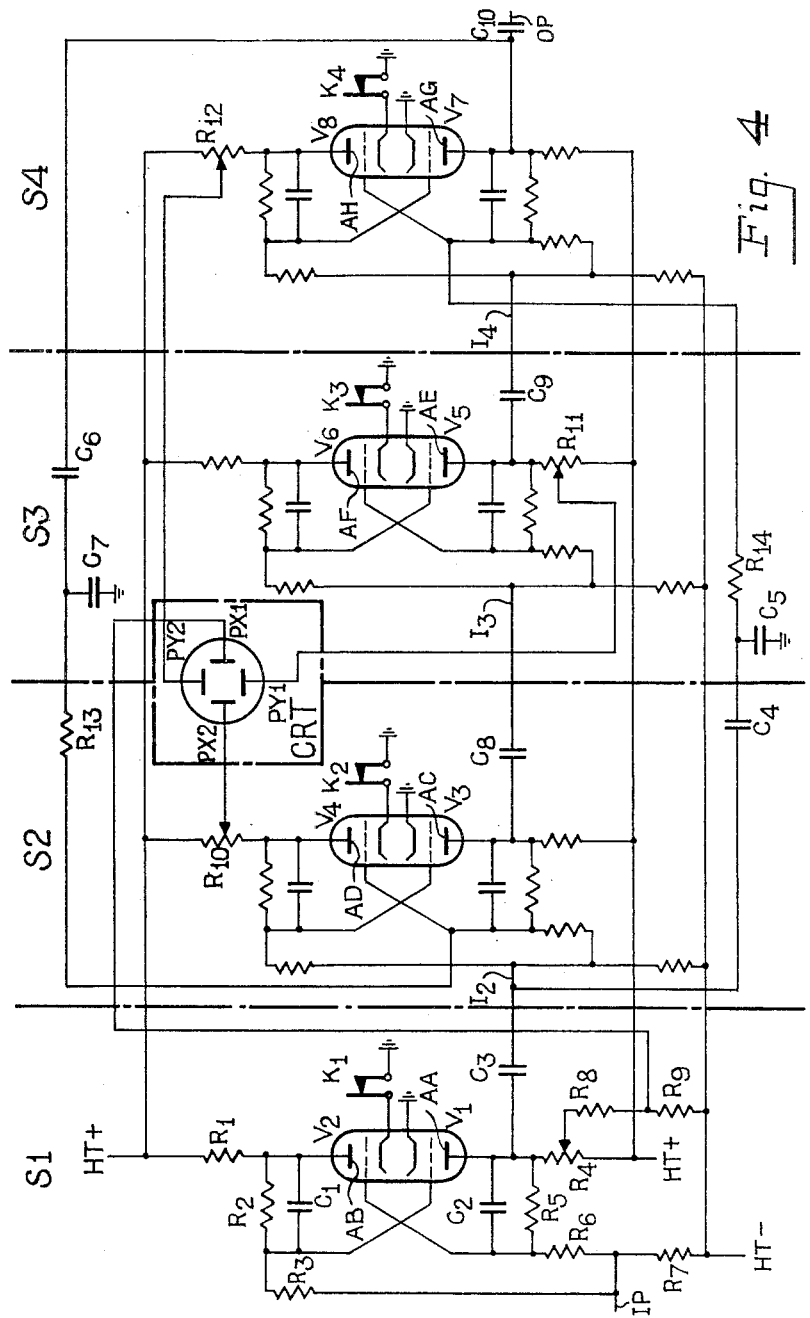

Referring now to Fig. 4 this shows a detailed circuit diagram of a decade counter employing four binary stages and embodying those circuit elements shown in Figs. 2 and 3. Similar references in Fig. 4 and Figs. 1, 2 and 3 denote like components while resistors $R_4$, $R_1$, $R_{10}$, $R_{11}$, $R_{12}$, $R_8$ and $R_9$ correspond respectively with resistors YA, YB, YD, YE, YH, YJ and YK in one or both of Figs. 2 and 3.

The binary stages S1 to S4 each include a pair of cross-connected triode valves such as $V_1$ and $V_2$ and the like, for stage S1, the valves being shown for convenience in a single envelope. Each stage has two possible states of stable equilibrium when one or other of its valves is conducting.

In the normal condition valves $V_1$, $V_3$, $V_5$ and $V_7$ are conducting and negative-going trigger pulses are applied to the input lead IP. Considering the stage S1, the conducting condition of V1 is maintained by the potential applied to its control grid via the potentiometer R1, R2 and R3 and similarly the non-conducting condition of V2 is maintained by the potentiometer R4, R5 and R6. The voltage at the tapping point on R4 is low and this voltage is fed via the potentiometer R8, R9 to the PX1 plate of the cathode ray tube as described with reference to Fig. 3 and the potential differences between the pairs of plates is such as to illuminate the digit "0" on the screen.

To trigger stage S1 to its alternative state of stable equilibrium, a negative-going impulse is applied to the input lead IP and the voltage developed across resistance R7 is applied to the two control grids. Valve V1 thus ceases to conduct and the voltage at the anode AA therefore increases and this increase is applied through capacitor C2 to the grid of valve V2 whereupon that valve becomes conducting. Consequently the voltage distribution along the potential dividers are changed at corresponding points one with the other and thus the stage now being in the second state of equilibrium has effectively recorded receipt of one impulse.

On the receipt of the second negative pulse, stage S1 reverts to its original condition and when the potential at anode AA is reduced as valve V1 again becomes conducting, a negative-going pulse is fed over capacitor C3 to the input lead of the second and substantially similar binary stage S2.

Thus stage S1 is triggered by each successive negative impulse applied to the input lead IP and each alternate triggering function produces a negative impulse which is applied to the input lead I2 of the second binary stage S2. In a similar manner negative impulses applied to the input leads I3 or I4 of stages S3 and S4 cause the relevant stage to be triggered due to each successive impulse and produce an output pulse upon each alternate triggering operation.

Assuming that in the zero condition valves V1, V3, V5 and V7 are conducting, the condition of the stages, as indicated by the valves conducting at the various points in the train, in response to nine negative-going impulses are as tabulated below:

| Impulse | Stage S1 | Stage S2 | Stage S3 | Stage S4 |
| --- | --- | --- | --- | --- |
| 1 | $V_2$ | $V_3$ | $V_5$ | $V_7$ |
| 2 | $V_1$—— | —$V_4$ | $V_5$ | $V_7$ |
| 3 | $V_2$ | $V_4$ | $V_5$ | $V_7$ |
| 4 | $V_1$—— | —$V_3$—— | —$V_6$ | $V_7$ |
| 5 | $V_2$ | $V_3$ | $V_6$ | $V_7$ |
| 6 | $V_1$—— | —$V_4$ | $V_6$ | $V_7$ |
| 7 | $V_2$ | $V_4$ | $V_6$ | $V_7$ |
| 8 | $V_1$—— | —$V_3$—— | —$V_5$—— | —$V_8$ |
| 9 | $V_2$ | $V_3$ | $V_5$ | $V_8$ |

In the table the horizontal lines between various stages indicate that, due to the application of the appropriate input pulse, a pulse is fed from one stage to the succeeding stage at that point in the train.

Referring again to the circuit it will be noted that each time valve V1 becomes conducting, due to the application of an even input impulse, a negative-going impulse is extended to lead I2 and simultaneously by way of the arrangement comprising capacitors C4 and C5 and resistor R14 to the grid of valve V8. Since this valve remains non-conducting until the application of the eighth impulse to lead IP the reductions in grid potential due to the said even impulses are ineffective. However it will be observed that valve V8 is conducting before the 10th pulse is applied to lead IP. When that pulse is applied, stage S1 is triggered to its rest condition so that a negative-going pulse is extended simultaneously to the impulse input lead I2 of stage S2 and directly to the grid of valve V8. Stages S2 and S4 start to trigger but before these triggering operations are completed a negative-going pulse is being simultaneously fed over capacitor C10 whence it may be applied to a succeeding decade counter if desired and also by way of the arrangement comprising capacitors C6 and C7 and resistor R13 directly to the grid of valve V4. The pulse so applied to V4 prevents the impulse initially applied to lead I2 from being effective and valve V3 is again maintained in the conducting condition. It follows therefore that the tenth impulse applied to lead IP causes the circuit to restore to its resting condition that is with valves V1, V3, V5 and V7 conducting.

It may be mentioned that the arrangement comprising capacitors C4 and C5 and resistor R14 while permitting negative impulses to be transmitted from lead I2 to the grid of valve V8 acts as a decoupling network in the reverse direction. Similar considerations apply to the arrangement comprising capacitors C6 and C7 and resistor R13.

It will be noted that the connections to the deflecting plates PX1, PX2, PY1, and PY2 are the same as those shown in Figs. 2 and 3 and consequently the spot will take up positions in which the digits "0" to "9" are illuminated successively on the screen of the tube.

The switches K1 to K4 are employed for resetting purposes and serve when operated to cause the associated valves to become non-conducting and the opposite valves to become conducting. It is, of course, not essential that four switches should be used and these may be replaced by a single switch normally connecting earth potential to the four upper cathodes.

I claim:

1. A decade counting circuit comprising four thermionic valve counting stages each operating on the binary scale, an anode load for each of said thermionic valves, a cathode ray tube having the digits 0 to 9 provided in rows on the screen thereof, each row containing a maximum of four digits, a pair of horizontal and a pair of vertical deflection plates for said tube, means for connecting a tapping point on the anode load of the normally conducting valve of the first stage to one of the horizontal deflection plates, means for connecting a tapping point on the anode load of the normally non-conducting valve of the second stage to the other horizontal deflection plate, means for connecting a tapping point on the anode load of the normally conducting valve of the third stage to one of the vertical deflection plates and means for connecting a tapping point on the anode load of the normally non-conducting valve of the fourth stage to the other deflection plate.

2. A decade counting circuit as claimed in claim 1 wherein the tapping points are so chosen that the potential difference between the tapping points feeding the horizontal deflection plates varies by a predetermined fixed amount for each count while that between the tapping points feeding the vertical deflection plates varies by a predetermined fixed amount for every four counts.

3. A decade counting circuit as claimed in claim 1 wherein means are provided for applying a permanent shift voltage between the horizontal deflection plates in order to provide a symmetrical display.

4. A decade counting circuit comprising four thermionic valve counting stages each operating on the binary scale, a load resistor for each of said thermionic valves, a cathode ray tube having the digits 0 to 9 provided in rows on the screen thereof, two pairs of deflection plates for said tube, connection between the load resistors of the normally conducting and normally non-conducting valves of said first and second stages respectively and one pair of said deflection plates and connections between the load resistors of the normally conducting and normally non-conducting valves of said third and fourth stages respectively and the second pair of said deflection plates whereby the voltages applied to said one pair of deflection plates from said first-mentioned load resistors control the movement of the electron beam along the rows while those applied to said second pair of deflection plates from said second-mentioned load resistors control the movement of the electron beam from one row to the next.

GEORGE THOMAS BAKER.

REFERENCES CITED

The following references are of record in the file of this patent:

UNITED STATES PATENTS

| Number | Name | Date |
| --- | --- | --- |
| 2,267,827 | Hubbard | Dec. 30, 1941 |

FOREIGN PATENTS

| Number | Country | Date |
| --- | --- | --- |
| 857,806 | France | Oct. 1, 1940 |

OTHER REFERENCES

"Electronic Counters," Grosdoff; RCA Review, Sept. 1946; vol. VII, No. 13.

"Predetermined Counter," Blume; Electronics, Feb. 1948; pages 88–93.